Nov. 14, 1967

J. D. BENNETT ET AL 3,353,020

AUTOMATIC CONTROL SYSTEM FOR AN
X-RAY DIFFRACTION APPARATUS

Filed Oct. 15, 1964

INVENTORS
JOHN D. BENNETT
PRESTON E. CHANEY
JACK W. JONES &
STANLEY B. McCALEB

BY

ATTORNEY

Nov. 14, 1967 J. D. BENNETT ET AL 3,353,020
AUTOMATIC CONTROL SYSTEM FOR AN
X-RAY DIFFRACTION APPARATUS
Filed Oct. 15, 1964 9 Sheets-Sheet 2

INVENTORS
JOHN D. BENNETT
PRESTON E. CHANEY
JACK W. JONES &
STANLEY B. McCALEB
BY
ATTORNEYS

INVENTORS
JOHN D. BENNETT
PRESTON E. CHANEY
JACK W. JONES &
STANLEY B. McCALEB

ATTORNEYS

INVENTORS
JOHN D. BENNETT
PRESTON E. CHANEY
JACK W. JONES &
STANLEY B. McCALEB

ATTORNEYS

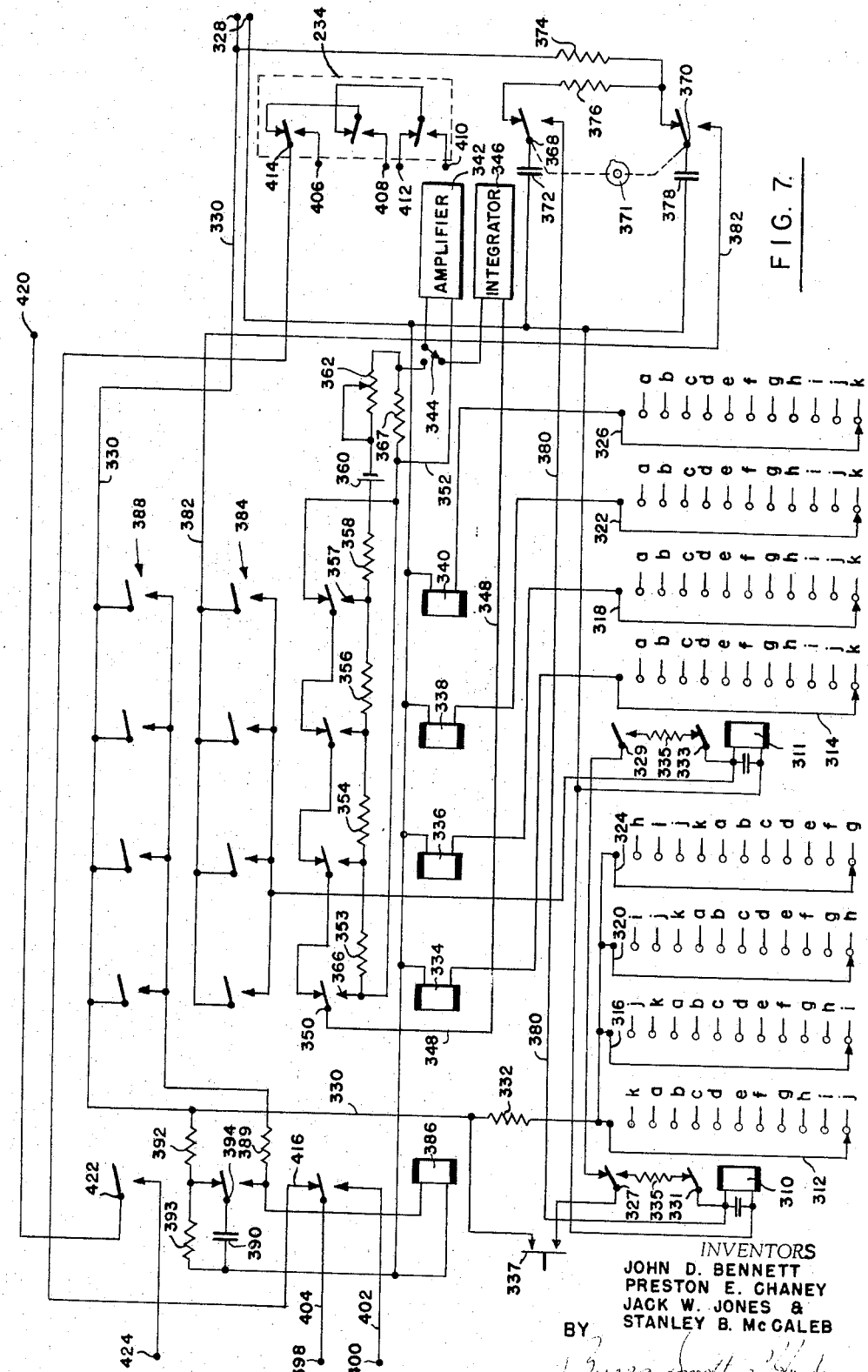

Nov. 14, 1967  J. D. BENNETT ET AL  3,353,020
AUTOMATIC CONTROL SYSTEM FOR AN
X-RAY DIFFRACTION APPARATUS

Filed Oct. 15, 1964  9 Sheets-Sheet 9

INVENTORS
JOHN D. BENNETT
PRESTON E. CHANEY
JACK W. JONES &
STANLEY B. McCALEB
BY
ATTORNEYS

United States Patent Office 3,353,020
Patented Nov. 14, 1967

3,353,020
AUTOMATIC CONTROL SYSTEM FOR AN
X-RAY DIFFRACTION APPARATUS
John D. Bennett, Richardson, Preston E. Chaney, Dallas, and Jack Weir Jones and Stanley B. McCaleb, Richardson, Tex., assignors to Sun Oil Company, Philadelphia, Pa., a corporation of New Jersey
Filed Oct. 15, 1964, Ser. No. 404,091
13 Claims. (Cl. 250—51.5)

ABSTRACT OF THE DISCLOSURE

An automatic control system for an X-ray diffraction apparatus removes the slides from a rotatable slide magazine, causes them to be scanned, and re-inserts the slides in the magazine. If a slide is missing from a particular position in the magazine, the control system eliminates the scanning step.

An automatic shut-off circuit removes power from the entire apparatus if a malfunction causes the scanning cycle to exceed a particular predetermined length of time.

The scanner and the recorder are driven by stepping motors which receive driving pulses at various selectable frequencies from a binary dividing circuit. Particular driving frequencies for these motors are selected by switches operated by the recorder shaft so that the scanning speed becomes slower as the input to the recorder increases. If the recorder input falls below a predetermined level, the points at which the speed changes occur are reset so that they are dependent on the lowest received X-ray intensity.

A range changing circuit is provided so that when the input to the recorder reaches a predetermined limit, a bucking voltage is connected in series with the input to establish several recording ranges in which the sensitivity of the recorder is the same for each range.

Collimating slits associated with the X-ray source and with the detector are automatically adjusted in correspondence with the goniometer angle.

This invention relates to automatic control systems, and particularly to a control system which is adapted to perform the various functions necessary in the operation of an X-ray diffraction apparatus.

Since the discovery of the diffraction of X-rays, a great number of applications and techniques have been developed. The proof of crystalline structure of clays gave rise to the development of mineral identification techniques employing X-ray spectrometry. Qualitative identification of the various minerals contained in clays can be accomplished by an examination of characteristic X-ray diffraction patterns.

An old technique, involving the use of a "powder camera," produced diffraction patterns on film strips which were characteristic of the minerals contained in clays being examined. The "powder camera method" is slow, primarily because of the length of time required for film exposure which ranges up to four hours in the case of identification of clay minerals. Additional time is required for film development and calculation of correction factors to compensate for film shrinkage after drying. Final interpretation of these film patterns requires considerable additional time. This method is, however, quite accurate, and is still used to obtain information on crystal structure. The powder camera method, because of the great amount of time required, is not applicable to routine identification procedures.

Modern X-ray spectrometers involve the use of X-ray-sensitive tubes such as Geiger tubes or photomultipliers arranged to trace the X-ray diffraction pattern characteristic of a particular sample. In the most common modern machines, a sample holder is arranged to rotate in front of an X-ray tube. The X-ray-sensitive detector is adapted by means of chains or gears to revolve about the sample in the plane of rotation of the sample and at twice the sample rotation speed. This speed relationship insures that the X-ray detector is maintained in a fixed relationship with the X-rays reflected directly from a given crystal lattice plane. The angle indicating means comprising the X-ray detector and the rotating means supporting it is commonly known as a goniometer.

The X-ray spectrum obtained from this type of apparatus is simply a plot of X-ray intensity versus goniometer angle. The X-ray intensity determines the amplitude of the output of the detector tube.

With this apparatus, the X-ray diffraction pattern of a particular sample may be obtained manually by taking measurements of detector outputs at various goniometer angles. More desirably, a continuous spectrum can be obtained by feeding the output of the X-ray detector into a chart recorder or the like, the speed of which is synchronized with the speed of the goniometer.

The primary advantage of the modern apparatus is the reduction of examination time. Single tracings can be made by the modern apparatus in times of the order of thirty minutes.

Because the intensities of X-rays received by the detector tube vary widely, scaling circuitry is often employed to compress the output of the detector into a range of variation which permits reasonably accurate interpretation of the X-ray spectrum over the entire range of intensities. The use of scaling circuitry, however, introduces a compromise. Identification of minerals or other crystalline materials depends on the measurement of relative intensities of diffracted X-rays at different angles. If the intensities of diffracted X-rays become too great at certain angles, additional measurements must be made at these angles with detector sensitivity reduced by a known amount. A considerable amount of additional time is required in these instances.

In the present invention, however, when the received X-rays become so great in intensity as to move the chart recorder pen near the edge of the chart, the range is automatically changed so that the recorder pen moves to the opposite side of the chart and records in a new range until the received X-ray intensity falls below a predetermined low level, at which time the recorder returns to its original range. The invention provides a plurality of ranges with equal sensitivities.

In accordance with the present invention, scanning speed is automatically reduced when peaks are encountered in diffracted X-ray intensity. In the identification of unknown substances the positions of these peaks cannot be predetermined, repeated scans in the positions where these peaks occur were heretofore necessary to obtain greater accuracy.

A compromise is also normally made with regard to collimating slit width. In routine identification, constant slit width combinations which give the best results for the minerals for primary concern are chosen. However, geometrical considerations suggested that better results can be obtained by the provision of different slit widths at different goniometer angles.

Constant-aperture receiving collimating systems view only a small portion of the target at large goniometer angles and view a large portion of the target at small goniometer angles. Received powder therefore drops off as the goniometer angle increases. Consequently, to compensate for this, it is desirable to provide a continuously adjustable collimating system whereby power received by the X-ray detector is essentially independent of the gometry of the system. Provisions for adjustment of both the collimating slit associated with the detector and the slit associated with the source is made in the present invention.

At small goniometer angles in systems with constant slit widths, a large amount of diffuse scattering of X-rays occurs because of the large area of the target illuminated by the X-ray source. A detector with a wide aperture tends to pick up a considerable amount of scattered X-rays and consequently a large signal-to-noise ratio results. The provision of small slit widths in both the source and detector collimators tends to minimize the signal-to-noise ratio.

The various operations mentioned above and numerous other operations required in the use of X-ray diffraction apparatus require the almost constant attention of at least one operator. Returning to the aspect of mineral identification, it is often the case that spectra of a very large number of samples must be obtained. Since the measurement of a single sample may take as much as thirty minutes, it is desirable to eliminate the need for constant attention of the apparatus by an operator. Continuous, unattended, overnight operation is immediately suggested. If samples whose X-ray spectra are to be measured are prepared on slides, an automatic slide changing apparatus is provided to remove and insert successive slides from and into the rotatable sample holding structure of a conventional X-ray diffraction apparatus.

The present invention relates to an apparatus which performs all the functions necessary to permit unattended operation of an X-ray diffraction apparatus over an extended period of time. It will become apparent that the substance of the present invention lies primarily in the provision of a novel programming and interlocking system which controls the operation of and correlates the functions of the various devices comprised in a complete X-ray spectrometer.

An object of the present invention is to provide an automatically operated sample changing mechanism for use in an X-ray diffraction apparatus.

A further object of the present invention is to provide a scanning speed control responsive to the output of an X-ray-sensitive detector in an X-ray diffraction apparatus.

A further object of the present invention is to provide an automatically operated range changer providing a constant sensitivity in all ranges in conjunction with the recorder of an X-ray diffraction apparatus.

A still further object is to provide an automatically controlled scanning apparatus in conjunction with an X-ray diffraction system.

A still further object of the present invention is to provide an X-ray diffraction apparatus with provisions for automatic adjustment of collimating slit widths.

A still further object is to provide a control system for use with an X-ray diffraction apparatus incorporating one or more of the features recited in the above objects which permits automatic, unattended operation of the apparatus and its associated devices.

These and other objects and features of the present invention will become apparent from the following description read in conjunction with the accompanying drawings, in which:

FIGURE 7 is a schematic diagram of a range-changing circuit in accordance with the present invention;

Figure 1:
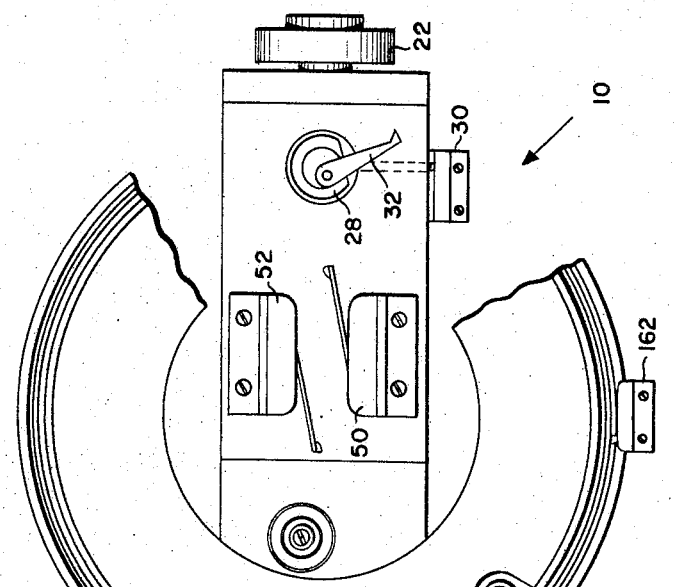
FIGURE 1 is a partially cut-away elevation of an automatic slide changer in accordance with the present invention.
Figure 2:
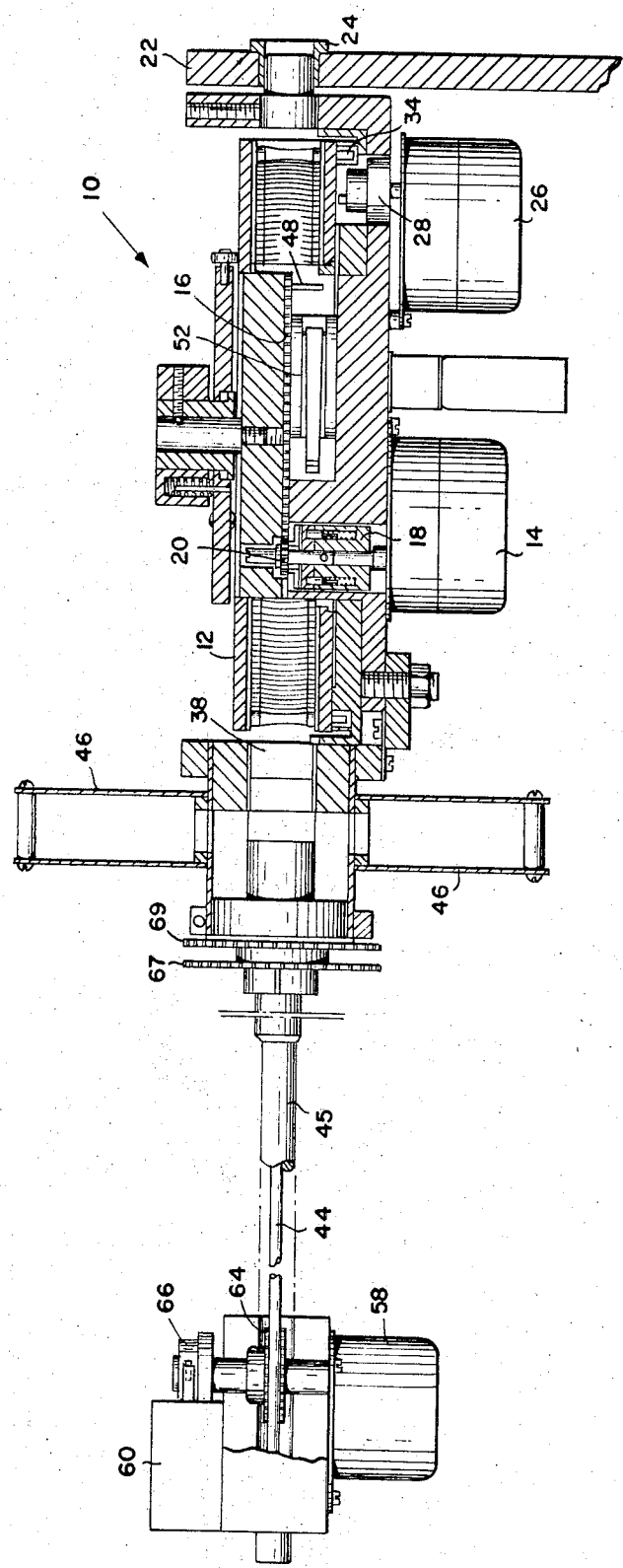
FIGURE 2 is a sectional view of a slide changer assembly.

Referring to FIGURES 1 and 2, there is shown a slide changing mechanism 10, comprising a circular slide magazine 12. A clock motor 14 with an output shaft geared to rotate at 10 r.p.m. is adapted to drive a rack 16 through clutch 18 and pinion 20.

The entire assembly 10 is supported, at one end, by a member 22, which is provided with a bearing 24, so that the slide changing assembly can rotate with respect to the supporting member.

A motor 26, similar to motor 14, and with an output shaft geared similarly, is provided to rotate a cam 28. A micro-switch 30 is adapted to be operated by cam 28. An eccentric indexing arm 32, operable by motor 26, is adapted to engage the salient member 34 on slide magazine 12. An indexing mechanism of this type is more fully disclosed and described in the application of Bennett and Caldwell, Ser. No. 403,523, filed Oct. 13, 1964, now Patent 3,301,364, issued Jan. 31, 1967.

A slide 36 is shown located between guide 38 and held by clamps 40 and 42. A slide ejecting arm 44, adapted to reciprocate within hollow arm 45, is shown abutting an edge of slide 36.

Disc-shaped X-ray shields 46 are provided to surround the sample slide 36 which is shown in the position in which X-ray spectrum measurements are made.

A pin 48, fixed to rack 16, is adapted to engage the arm of switch 50 in its rearward position and is adapted to engage the arm of switch 52 in its forward position.

A slide ejection actuator 54 is shown comprising a block 56, to which is fastened a motor 58 and a microswitch 60. Shaft 62 of motor 58 is provided with a pinion 64 and with a cam 66. Microswitch 60 is provided with a conventional arm and roller assembly to be actuated by cam 66.

Slide ejection arm 44, extending through hollow, cylindrical arm 45, is provided at its end within block 56 with a set of teeth in rack arrangement to be engaged and actuated by pinion 64.

A pair of sprockets 67 and 69 are provided in fixed relationship with the entire assembly 10. It will become apparent from a later description that rotating power for the entire assembly is provided through sprocket 69 and that sprocket 67 is provided to drive an adjustable collimating slit in the X-ray detection apparatus.

Figure 3:
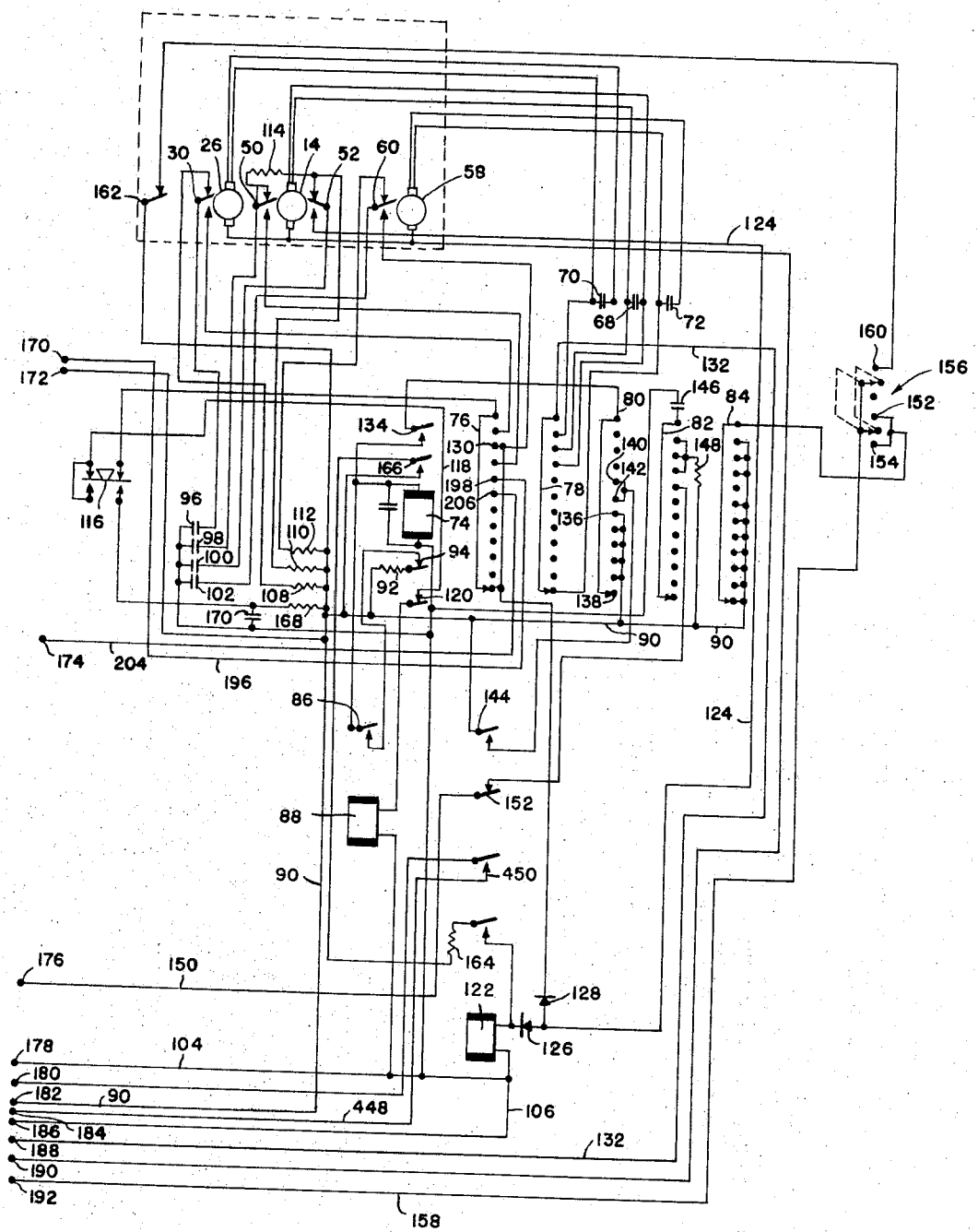
FIGURE 3 is a schematic diagram of a slide changer control system in accordance with the present invention.

Referring to FIGURE 3, motors 14, 26 and 58 of the slide-changer mechanism are shown. Each of these motors is provided with two phase windings, and quadrature current is supplied to the second phase winding of each motor by means of capacitors 68, 70 and 72, respectively.

A five-deck stepping switch 74 with decks 76, 78, 80, 82 and 84, respectively, is shown. Each successive actuation of stepping switch 74 is accomplished by closure of contacts 86 of relay 88 which causes current in line 90 to be delivered through resistor 92, through contact 94 of stepping switch 74, and through contact 86 to the coil of stepping switch 74. Because of the provision of contacts 94 on stepping switch 74, the coil of stepping switch 74 is only actuated momentarily. Relay 88 is always actuated by the discharge of one of capacitors 96, 98, 100 and 102. Its actuation is therefore also only momentary. Lines 104 and 106 are ground return lines.

Charging of the capacitors by current in line 90 is accomplished through resistors 108, 110 and 112 and through switches 60, 52, 50 and 30 in the positions shown. Capacitor 96 is charged through the contacts of switch 30 by current in resistor 108. Capacitor 98 is charged through the contact of switch 50 by the current through resistors 114 and 110. Capacitor 100 is charged through the contact of switch 52 by current in resistor 110. Capacitor 102 is charged through the contact of switch 60 by the current through the resistor 112.

Each of capacitors 96, 98 and 102 is discharged through the contacts of its corresponding switch in the position other than that shown, through the movable contact on deck 76, through the normally closed contacts of pushbutton 116, through line 118, and through contact 120 of stepping switch 74 to deliver an operating pulse to relay 88. Capacitor 100, on the other hand, is connected to deliver an operating pulse to relay 122 through switch 52, line 124 and diode 126. Diode 128 is provided to deliver pulses in line 24 to contact 130 on deck 76.

Deck 78 is a motor selector deck, and is connected to provide current from line 132 for the operation of motors 14, 26, and 58. Only one of these motors can operate at any given time, and slide injector motor 14 is connected to be operated both in forward and in reverse direction.

Deck 80 is a homing deck, and is connected to deliver current in line 90 through contacts 134 of stepping switch 74 to operate stepping switch 74. Contact 134 is operated by a cam rotated with the wipers of the stepping switch 74, according to conventional practice, so that it is closed in all positions of the wipers except the home position (the position shown in the drawing). It will be apparent that, when the moving contact of deck 80 reaches contact 136, stepping switch 74 will automatically step successively until the movable contact on deck 80 reaches contact 138. This method of homing a stepping switch conforms to conventional practice. Contacts 140 and 142 are connected to line 90 through normally open contacts 144 of relay 122.

A capacitor 146 is connected to be charged through resistor 148 when the stepping switch is in one of its first three positions. The fourth terminal on deck 82 is connected to line 150 through normally closed contact 152 of relay 122.

All of the terminals except the fourth terminal of deck 84 are connected together and to line 90. The moving contact of deck 84 is connected to terminals 152 and 154 of a ganged switch 156. The movable contacts of switch 156 are connected to line 158. Contact 160 is connected through the normally closed contacts of switch 162 to line 90.

Relay 122 is connected through a set of its normally opened contacts, through resistor 164, and through the normally opened contacts 166 of stepping switch 74 to line 90. A normally opened contact of push-button 116 is connected through resistor 168 to line 90, and through capacitor 170 to line 104.

Figure 4:
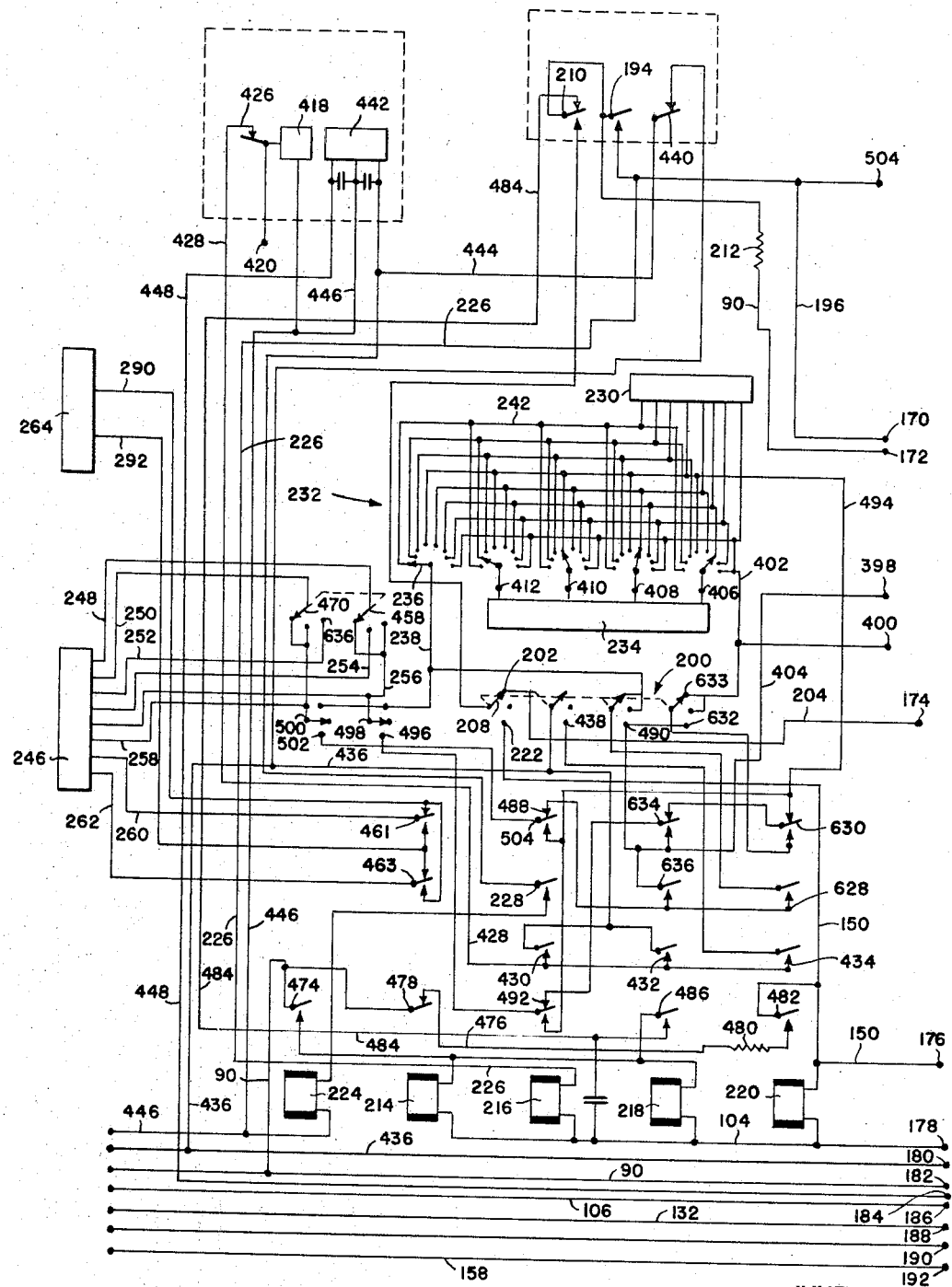
FIGURE 4 is a schematic diagram of a goniometer and chart recorder speed control system.

Referring to FIGURES 3 and 4, the interconnections between the two circuits shown are indicated by identically numbered terminals 170 through 192. The normally opened contact of switch 194 is connected through line 196 to contact 198 on deck 76 of stepping switch 74. A four-pole triple-throw switch 200 is shown with contact 202 connected through line 204 to contact 206 on deck 76. Wiper 208 of switch 200 is connected to the normally open contact of switch 210. The moving contact of switch 210 is connected through resistor 212 to line 90. A set of multiple-contact relays comprising relays 214, 216, 218 and 220 are provided with a common connection to line 104. Relay 220 is connected through line 150 and through the fourth contact on deck 82 of stepping switch 74 to be operated by discharge of capacitor 146. Line 150 is also connected to contact 222 of switch 200. Switch 194 is arranged to be actuated at one limit of goniometer scan, and switch 210 is actuated at the other limit of scan.

Relay 218 is connected to be operated simultaneously with relay 214 and is connected to the normally open contact of relay 224. The moving contact of relay 224 is connected to line 90. The coil of relay 216 is connected through line 226 to line 196. Relay 224 is connected to be operated by closure of contact 228 of relay 216.

A pulse source 230 is connected through a set 232 of selector switches to a set of speed change switches 234. An additional bank 236 is provided to deliver pulses from source 230 selectively to line 238.

Figure 5:
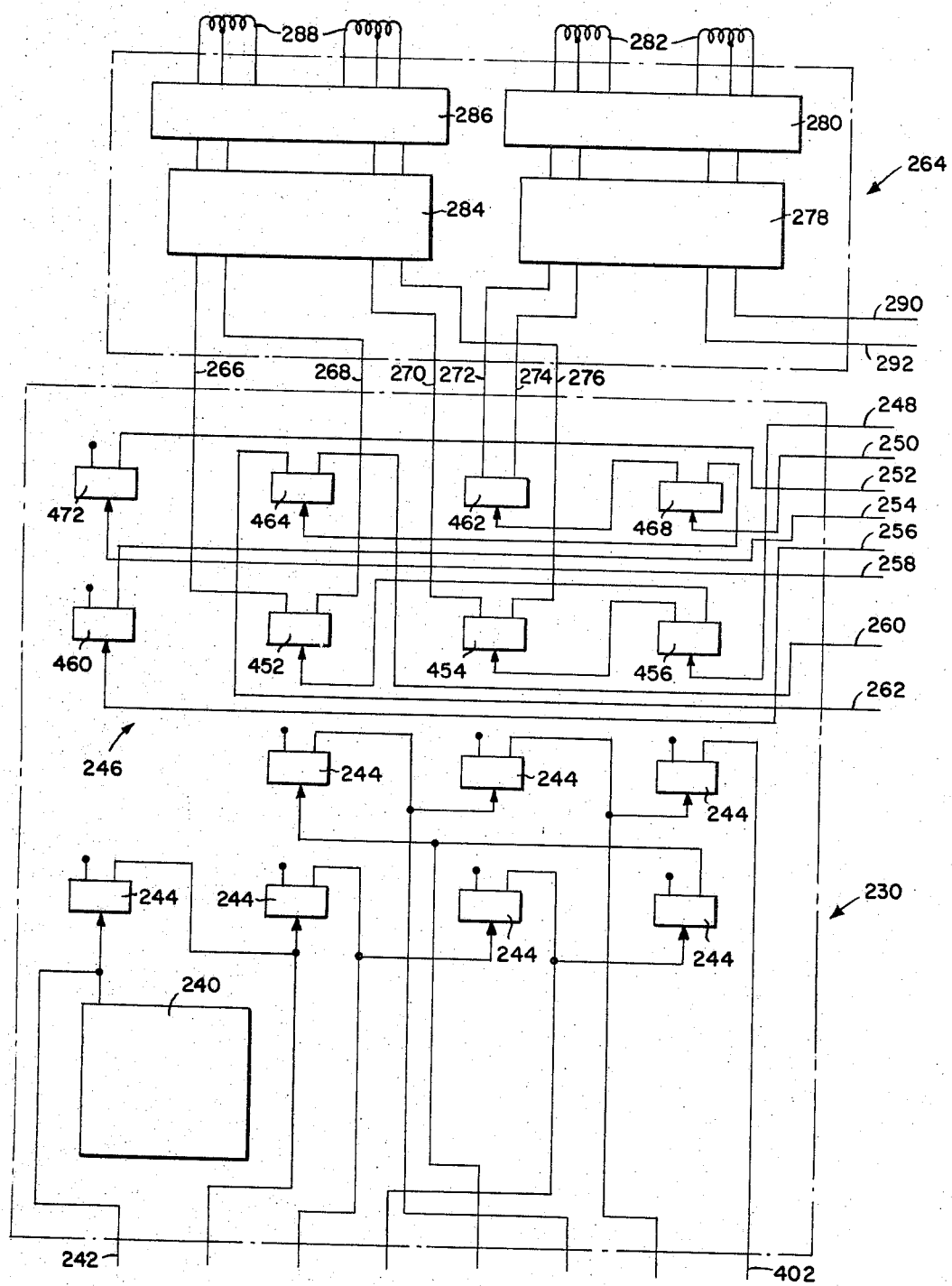
FIGURE 5 is a schematic diagram of a variable frequency pulse producing means in association with a pair of motor drive circuits to be used in conjunction with the control system of FIGURE 4.

Pulse source 230 is shown in more detail in the bottom part of FIGURE 5. A 240 cycle-per-second pulse oscillator 240 is shown having its output connected to line 242. The output of pulse oscillator 240 is also delivered to the input of a cascaded series of seven bistable multivibrators 244. The output pulses of each of these multivibrators are delivered respectively to the terminals on the banks of selector switch 232.

Referring to FIGURES 4 and 5, an additional set 246 of multivibrators is connected to the circuitry of FIGURE 4 through lines 248 through 262. A pair of motor-driver circuits 264 is shown interconnected with multivibrator set 246 through lines 266 through 276. Blocks 278 and 280 constitute a driver circuit for a synchronous stepping motor represented by field coils 282. This motor is the goniometer drive motor for the X-ray diffraction apparatus. Blocks 284 and 286 constitute a driver circuit for a similar motor represented by field coils 288. This motor determines the speed of a moving chart in a chart recorder.

The driver circuit of block 278 receives another input from the circuitry of FIGURE 4 through lines 290 and 292.

Figure 6:
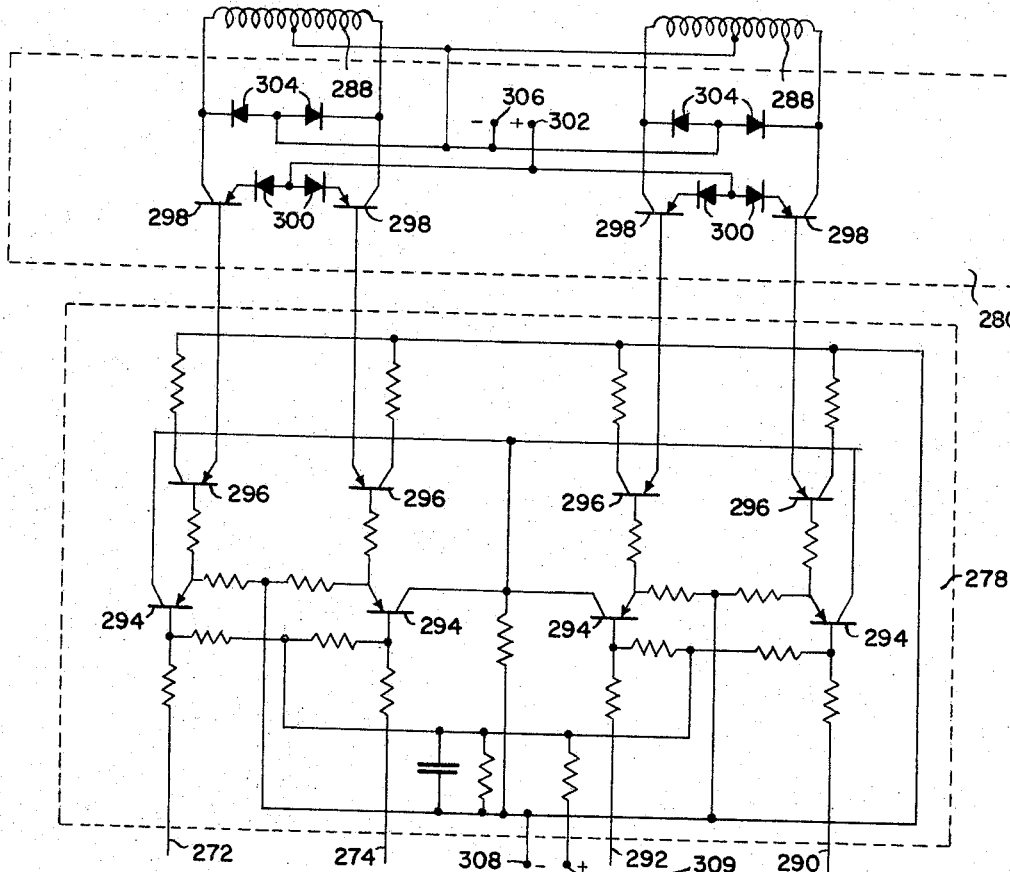
FIGURE 6 is a detailed schematic diagram of the motor driver circuits of FIGURE 5.

Referring to FIGURES 5 and 6, the details of the circuitry within blocks 278 and 280 are shown. The circuitry of block 278 is identical with that of block 284, and the circuitry of block 280 is identical with that of block 286. Transistors 294 receive inputs to their bases through lines 272, 274, 292 and 290, respectively. The outputs of transistors 294 are fed to the bases of transistors 296 whose emitters are connected directly to the bases of corresponding transistors 298. Transistors 298 are connected in a push-pull arrangement to powder the field coils 282 of the stepping motor. Diodes 300 provide an emitter bias for transistor 298. Diodes 304 are provided to clip negative surges induced in the motor windings 288 when current through the windings is suddenly reversed. D.C. power for operation of the motor is provided at terminals 302 and 306. Terminals 308 and 309 are provided to deliver power to the amplifiers in block 278.

The goniometer and chart drive motors are synchronous stepping motors of the type known commercially as SLO-SYN. The shaft of a motor of this type steps approximately 1.8° each time the polarity in its field windings is reversed. Therefore, it will step through one revolution for each two hundred pulses provided at the input to its driving circuitry.

Referring to FIGURE 7, a pair of four-deck stepping switches 310 and 311 are shown. Deck 312 is interconnected with deck 314; deck 316 with deck 318; deck 320 with deck 322; and, deck 324 with deck 326. For simplicity in the drawing, the interconnections between the decks of stepping switches 310 and 311 are indicated by the use of a lettering system, which will be readily understood from the following example. Terminal j of deck 316 is wired to terminal *j* of deck 313. Terminal *a* of deck 324 is wired to terminal *a* of deck 326, and so on.

A manually operable resetting provision is made for stepping switches 310 and 311 in cam-operated contacts 327 and 329 which, like the contacts 134 on stepping switch 74 are maintained in their lower positions except in the "home" position, which is the position in which both stepping switches are shown. Contacts 331 and 333 are interrupter contacts for the respective stepping switches and are opened whenever their corresponding coils are energized. Resistors 335 are current limiting resistors.

A relay power supply connected to terminals 328 feeds power through lines 330, and through resistor 332 to the wipers of decks 312, 315, 320 and 324 of stepping switch 310. The operation of the manual resetting provision for stepping switches 310 and 311 is initiated by closure of push-button 337 which must be held until the homing operation is completed. By closure of button 337, current is delivered from line 330, through closed contacts 337, through resistor 335 and through contacts 331 to energize the coil of stepping switch 310. Energization of the coil momentarily breaks contacts 331. Contacts 331 reclose and the operation is continued until stepping switch 310 reaches its home position, at which time contacts 327 are permitted to switch the current from line 330 to closed contacts 329 on stepping switch 311 which homes itself in exactly the same manner as stepping switch 310. Closure of push-button 337, then, first causes stepping switch 310 to home itself, and after this is accomplished, stepping switch 310 automatically transfers the homing current from the push-button to the homing circuit of stepping switch 311.

From a consideration of the interconnections between the decks of stepping switch 310 and the decks of stepping switch 311, it will be apparent that current from line 330 will be delivered to one of relays 334, 336, 338 and 340, depending on the relative positions of the wipers of stepping switches 310 and 311.

An amplifier 342, associated with the input to a chart recorder, is provided, through switch 344, with the output of an integrator 346 associated with the output of an X-ray sensitive detector. The other side of the output of integrator 346 is connected to line 348 to a movable contact 350 on relay 334. It is further connected to the input line 352 of recorder amplifier 342 through a series of similar contacts on relays 336, 338 and 340. Normally opened contacts on these relays are connected by resistors 353, 354 and 356. Contact 357 is connected, through resistor 358, battery 360, potentiometer 362 and resistor 367, to normally opened contact 366 on relay 334. It will be apparent that a bucking voltage is provided by battery 360. The effect of this voltage in determining the response of the recorder to the output of integrator 346 is determined by which relay of relays 334 through 340 is activated. Calibration of the bucking voltage circuit is accomplished by changing the position of switch 344 so that amplifier 342 receives the voltage across resistor 367 at its input. Potentiometer 362 is then adjusted to give the proper reading on the chart recorder.

Switches 368 and 370 are operated by cam 371 on the shaft operating the recorder stylus so that, when the recorder deflection reaches its upper limit, switch 368 is closed and, when the recorder deflection falls below 5% of its full scale, switch 370 is closed. Capacitor 372 is charged through the series combination of resistors 374 and 376, by the voltage terminal 328. Capacitor 378 is charged through resistor 374.

Full-scale deflection of the chart recorder causes switch 368 to close and discharge capacitor 372 through line 380 to activate the coil of stepping switch 310. Closure of switch 370, when recorder deflection reaches a predetermined low value, connects capacitor 378 to line 382. If one of relays 334 through 340 is closed, capacitor 378 is discharged through one of contacts 384 to operate the coil of stepping switch 311. Thus, each time the recorder deflection reaches a maximum, stepping switch 310 moves a step ahead of 311 shifting the recorder to the next higher range. Each time the recorder deflection falls below 5% of full scale, stepping switch 311 moves to catch up with 310 to shift the recorder to the next lower range.

The value of the bucking voltage is high enough to cause the recorder stylus to return to a low level on the chart when switch 368 is closed, but is not great enough to cause the stylus to fall below 5% of its full scale causing switch 370 to close. If the bucking voltage were too high, the stylus would alternately activate switches 368 and 370 causing oscillation.

Relay 386 is connected to be operated through resistor 389 by current in line 330 through closure of one of contacts 388 on relays 334 through 340. Capacitor 390 is charged through a voltage divider comprising resistors 392 and 393 from line 330. When relay 386 operates, capacitor 390 is connected across the coil of relay 386. Thus, when contacts 388 open, capacitor 390 delays the opening of relay 386.

With regard to the various interconnections between the circuitry of FIGURES 4 and 7, corresponding terminals 398 and 400 are connected so that, when relay 386 closes, the variable speed pulses from speed change switches 234 are disconnected from line 404 and low-speed pulses from line 402 are connected to line 404. It will be apparent that, in all but the lowest recorder ranges, the scan and chart speeds will be determined by these low-speed pulses.

FIGURE 7 shows a set 234 of speed-change switches which are connected to the wipers of speed-selector switches 232 through terminals 406 through 412. Switches 234 are cam-operated microswitches which are mounted on the recorder so that they are operated successively as recorder deflection increases. The moving contact of switch 414 is connected to contact 416, which is normally closed to line 404. The operation of these speed-change switches will be discussed later.

Figure 14:
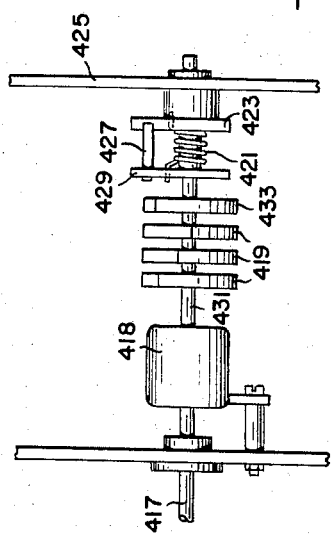
FIGURE 14 is an elevation of a clutch and cam mechanism associated with the speed control system of FIGURE 4.

Referring to FIGURE 14, a shaft 417 is shown operating a set of four cams through a magnetic clutch 418. This shaft is operated by the deflection mechanism of the chart recorder so that, when clutch 418 is actuated, the cams rotate in response to recorder deflection. A coil spring 421 is fixed at one end to a member 423 fixed to a shaft bearing mounted on frame 425. A stop pin 427 is fixed to a member 429 which, in turn is rotated by the camshaft 431. Pin 427 engages the upper end of member 423 at the two extremes of shaft rotation. The other end of the coil spring 421 passes through a hole in member 429 and is tensioned so that, when clutch 418 is disengaged, shaft 431 assumes a stop position intermediate the extremes determined by the stop pin. Each of cams 419 operates a respective actuator for one of switches 234 shown in FIGURE 7.

Referring to FIGURE 4, the coil of clutch 418 is connected to terminal 420 and is operated through contacts 422 of relay 386 in FIGURE 7. Terminal 424 is a clutch power supply terminal. The clutch can also be operated through switch 426, which is operated by the remaining cam 433 so that, if the recorder deflection falls below a predetermined value, it opens and releases clutch 418.

Clutch 418 is re-engaged when cam 433 closes switch 426 under the action of spring 421. Since the camshaft has relatively little inertia, the cams assume the stop position determined by the tension on the spring 421 before the clutch engages. Thus, the angular relationship between the recorder shaft and the speed-change cams is changed so that the deflections at which the speed changes occur are now dependent on the new low value of recorder deflection.

Referring again to FIGURE 7, it will be apparent that, during any of the range changing operations and throughout all of the upper ranges, contacts 422 remain closed holding the magnetic clutch engaged regardless of the position of the cam-operated switch 426. When the range changes from the second to the lowest range, capacitor 390, by virtue of its charge, delays the opening of relay 386 and, consequently, by holding contacts 422 closed, delays the disengagement of the clutch. This allows the recorder stylus to stabilize itself in the proper position at the high end of the chart without releasing the clutch. If the clutch were released before cam 433 closed switch 426, the stylus positions at which the speed changes occur would not correspond to the previously determined low value of recorder deflection.

The stationary contact of switch 426 is connected, through line 428, to contacts 430, 432 and 434 on relays 216, 218 and 220, respectively. Contacts 430 and 432 receive power from line 436, and contact 434 is connected to receive power from line 436 when the second wiper of switch 200 is closed to terminal 438.

Switch 440, in FIGURE 4, is a cam-operated switch which is arranged to be alternately opened and closed in response to goniometer movement. The operating cam is typically arranged so that switch 440 is closed for the first one-half degree and opened for the second one-half degree for every degree of goniometer scan. Switch 440 is connected to operate recorder chart marker 442 through line 444. Chart marker 442 is grounded through line 446, and is connected through line 448, to be operated by closure of contacts 450 on relay 122.

Referring to FIGURES 4 and 5, multivibrator set 246 comprises bistable multivibrators 452 and 454, the outputs of which are connected to motor driver circuit 484, and which are driven alternately by the outputs of bistable multivibrator 456. Multivibrator 456 receives its input from line 248 connected to the wiper of switch 458 on FIGURE 4. The output of bistable multivibrator 460 is connected through line 254 to the middle stationery contacts of switch 458. The input of multivibrator 460 is connected, through line 256, to the first and third contacts of switch 458.

The output of bistable multivibrator 462 is connected to the input of motor driver circuit 278, and the outputs of bistable multivibrator 464 are connected through lines 260 and 262 to a set of reversing contacts 461 and 463, the outputs of which are delivered to driver circuit 278 through lines 290 and 292. The input to bistable multivibrator 468 is received from the wiper of switch 470 through line 250, and its outputs drive multivibrators 464 and 462, respectively. Bistable multivibrator 472 receives its input from the first two contacts of switch 470 through line 258. The output of multivibrator 472 is delivered to the remaining contact of switch 470 through line 252.

Relays 214 and 218 are connected to be operated by closure of contacts 474 on relay 224. Relay 214 operates reversing contacts 461 and 463, and disconnects line 90 from line 476 by opening contact 478. Line 476 communicates through resistor 480 with the normally open contacts 482 of relay 220.

Actuation of relay 218 derives relay operating power from the upper, normally closed contact of switch 210 through line 484 and through contacts 486 of relay 218. Closure of relay 218 also connects the upper contact 488 of relay 216 to terminal 398 and to terminal 490 on the third bank of switch 200. Actuation of relay 218 also connects contact 488 of relay 216 to contact 492.

Closure of either of relays 218 and 220 disconnects pulses from line 494 with terminal 496 of switch 498. Closure of relay 216 connects pulses from line 494 directly to terminal 496. The movable contact of switch 498 is connected to line 256. The movable contact of switch 500 is connected to line 258, and its lower terminal 502 is connected to movable contact 504 of relay 216. The upper contacts of switches 500 and 498 are connected together and to wiper 236 of switch 232 through line 238.

Switch 194 is arranged to be closed at the forward limit of goniometer scan. Its closure delivers power from terminal 172 to terminal 504 which is connected to an automatic shut-off circuit.

Figure 8:
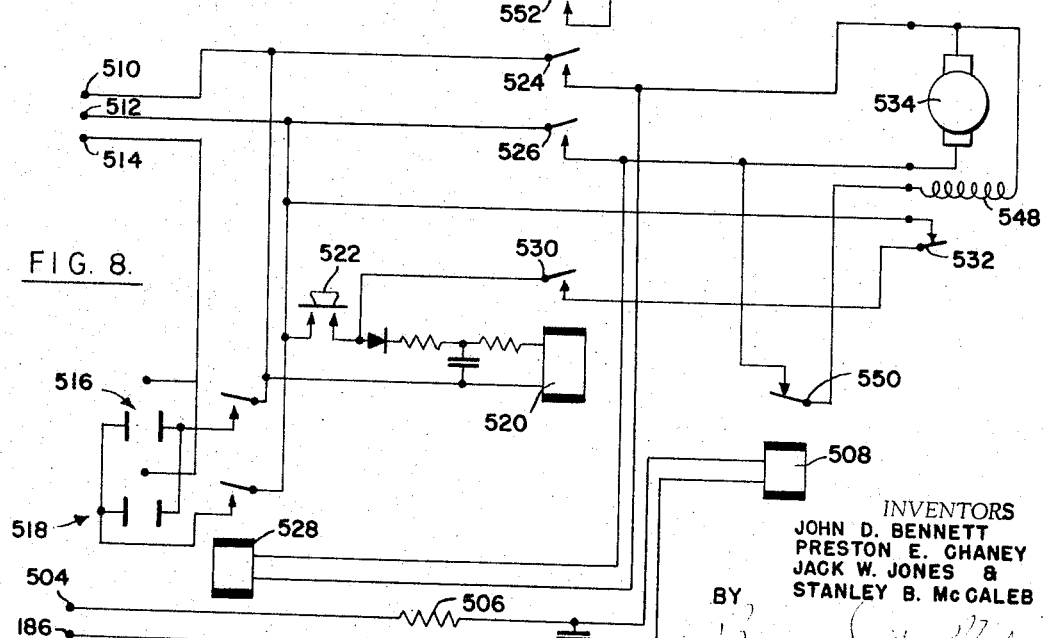
FIGURE 8 is a schematic diagram of an automatic shut-off circuit for use in conjunction with the apparatus of the present invention.

Referring to FIGURE 8, a time-operated automatic shut-off circuit for use in conjunction with the circuitry of the present invention is shown. Terminal 504 is connected to the coil of relay 508 through resistor 506. Terminal 186 is a relay power supply return connection. Line power for the entire system of the present invention is delivered through terminals 510, 512 and 514. Terminals 510 and 512 are power connections, and terminal 514 is grounded. All power supplies for the entire system are connected to three-wire line receptacles 516 and 518. A relay 520 is connected to be operated by closure of push-button 522. Actuation of relay 520 closes contacts 524 and 526 and delivers power to relay 528, which, in turn, closes, and delivers power from terminals 510 and 512 to receptacles 516 and 518 through its contacts.

Momentary closure of push-button 522 locks relay 520 closed through contacts 530 and through micro-switch 532.

Figure 13:
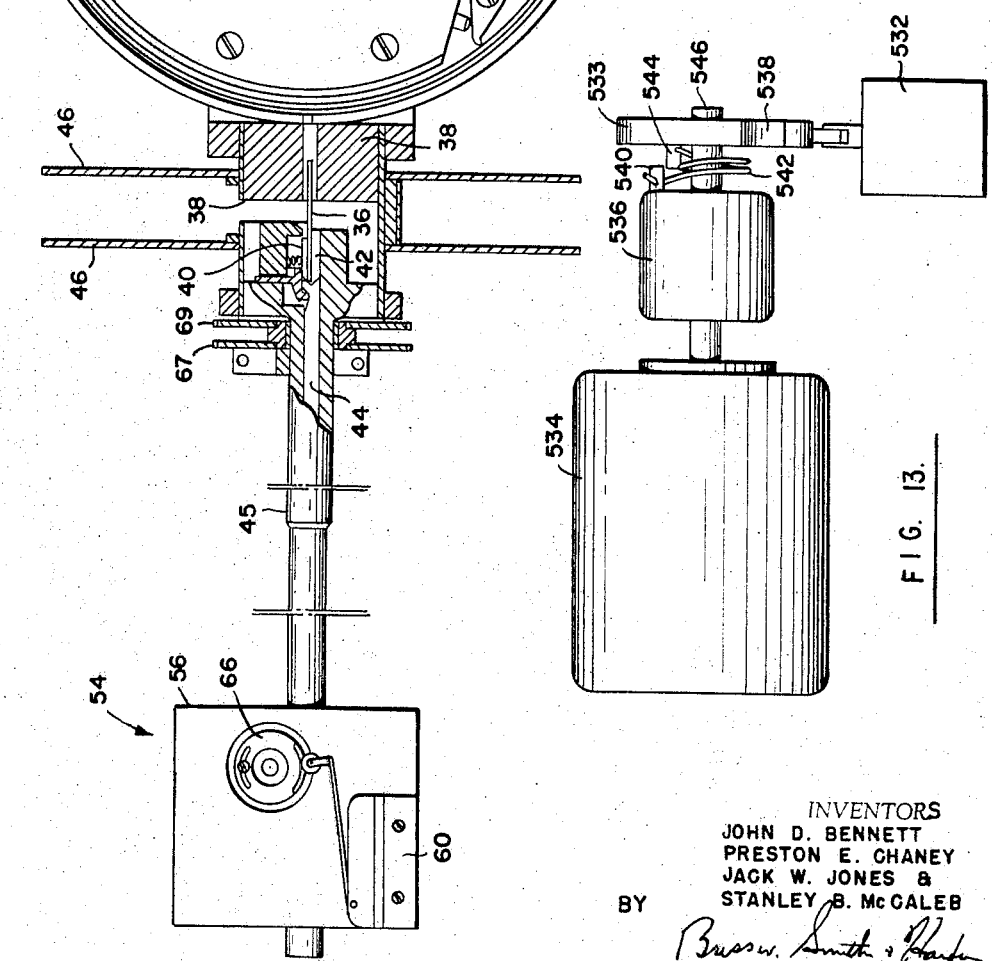
FIGURE 13 is an elevation of the timing mechanism in the automatic shut-off circuit of FIGURE 8.

As depicted by FIGURE 13, microswitch 532 is operated by a cam 533, which is rotated by clock motor 534 through magnetic clutch 536. Cam 533 is provided with an indentation 538, which is provided to permit opening of switch 532. A protruding member 540, fixed to clutch 536, is provided with a hole for insertion of coil spring 542. A similar protruding portion 544, fixed to cam 533 at a distance from shaft 546 equal to the distance of member 540 from shaft 546. When clutch 536 is engaged, shaft 546 rotates in a counterclockwise direction (facing the end of the shaft), and acts to wind coil spring 542 about itself. When clutch 536 is disengaged, coil spring 542 acts to urge shaft 546 and cam 533 in the clockwise direction until member 544 engages member 540.

Returning to FIGURE 8, coil 548 of clutch 536 is connected to be powered through contacts 550 of relay 508. Thus, clutch 536 is disengaged when relay 508 is actuated. Contacts 552 of relay 520 are connected to terminals 554 to operate, by their closure, a relay delivering high voltage power to the X-ray tube associated with the apparatus of the present invention.

Figure 10:
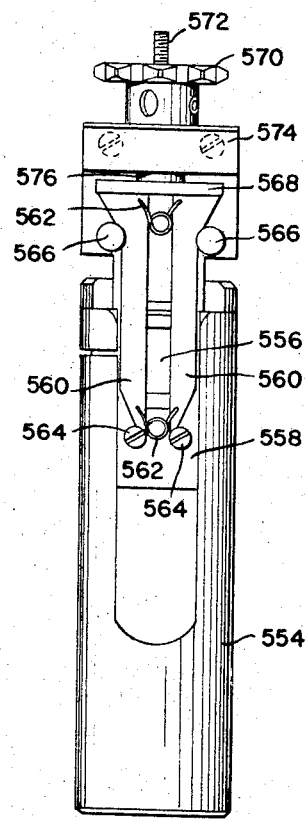
FIGURE 10 is an elevation of a variable-aperture collimating slit assembly.

Referring to FIGURE 10, a slit holder 554 having an open passage 556. A vertical groove 558 is provided for movement of adjustable slit-defining members 560, which are urged outwardly by springs 562 against screws 564 and against pins 566. A member 568 is provided in engagement with both slit members 560, and is adapted to urge them downwardly in response to rotation of sprocket member 570, the vertical inner bore of which is threadably engaged with threaded stud 572. The shaft of sprocket 570 is journaled within member 574. which is fixed to holder 554, and a flange 576 is provided to prevent upward movement of the sprocket assembly.

Figure 11:
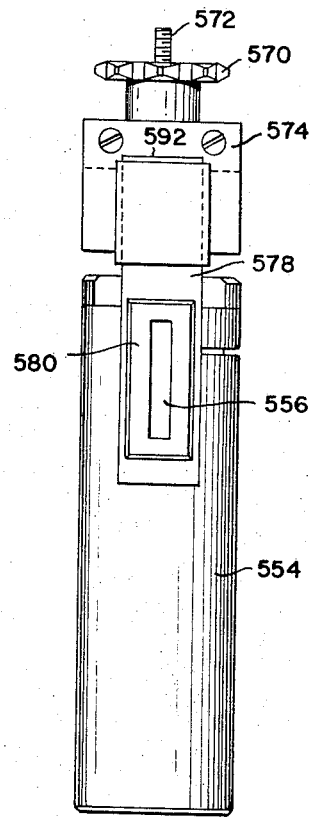
FIGURE 11 is an elevation of the opposite side of the assembly of FIGURE 10.

The opposite side of the adjustable slit assembly of FIGURE 10 is shown in FIGURE 11. A hollow member 578, with a window-defining member 580, is provided for the insertion of a stationary slit assembly through its upper end 592.

Figure 12:
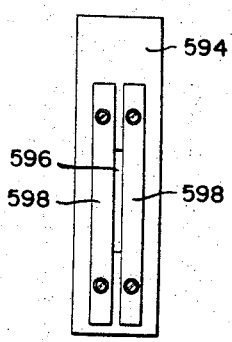
FIGURE 12 is a constant-aperture slit for use in conjunction with the assembly of FIGURES 10 and 11.

Referring to FIGURE 12, a stationary slit assembly comprising member 594 having a passage 596 is shown.

Slit-defining members 598 are held in position on member 594 by means of screws.

The collimating system, described in FIGURES 10, 11 and 12, therefore, comprises a slit of adjustable aperture an alignment with a slit of constant aperture. It will be apparent, from the following, that two such collimating systems are used in the apparatus of the present invention; one being associated with the X-ray detection means, and the other being associated with the X-ray source.

Figure 9:
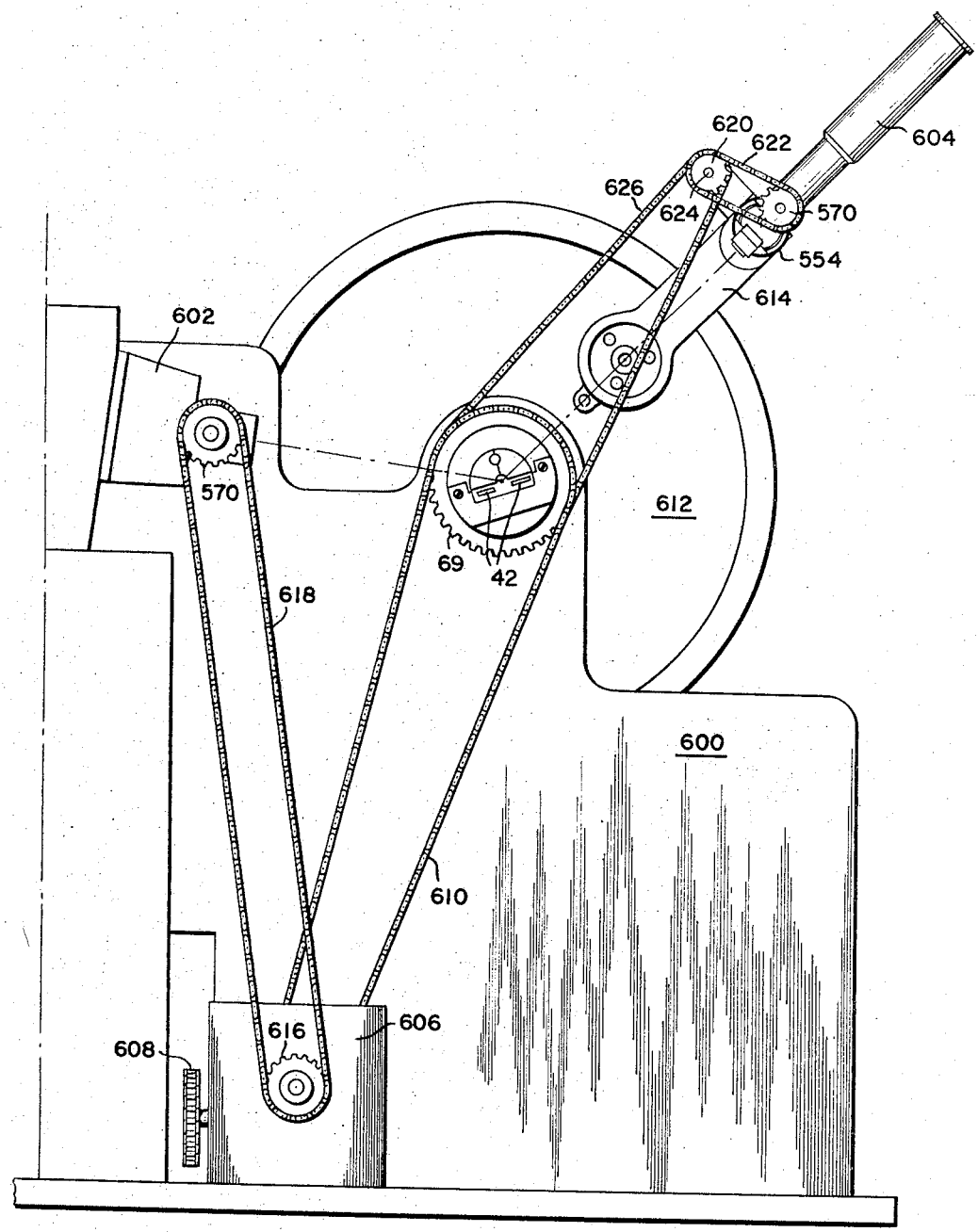
FIGURE 9 is an elevation of an X-ray source, a sample holder and a goniometer arm assembly in accordance with the present invention showing means for driving variable-aperture collimating slits.

A conventional X-ray diffraction apparatus is shown in FIGURE 9. The apparatus is provided with a stationary X-ray source 602 and a movable X-ray detector 604. A gear box 606 receives power from a motor 282 (FIGURE 5) through a chain driving sprocket 608. Sprocket 69 (FIGURES 1 and 2) is driven by chain 610. A disc 612 is geared internally to rotate at twice the angular speed of sprocket 69, and an arm 614 is provided on disc 612 to hold the X-ray detector 604 and a receiving slit assembly.

An adjustable slit system, as depicted in FIGURES 10, 11 and 12, is provided to collimate the X-rays emanating from X-ray source 602. Its sprocket 570 is driven by sprocket 616 of gear box 606 through chain 618.

A similar adjustable aperture collimating system 554 is provided in conjunction with the X-ray detection means 604. Its sprocket 570 is driven by sprocket 620 through chain 622. Sprocket 620 is arranged to be rotated by a shaft 624 fixed to another shaft driven by chain 626. Chain 626 is driven by sprocket 67, shown in FIGURES 1 and 2.

In operation, as the sample, held by clamps 42, turns clockwise by the action of chain 610, sprocket 616 turns counterclockwise and drives sprocket 570 counterclockwise through chain 618. Counterclockwise movement of sprocket 570 causes the slit associated with the X-ray source 602, to decrease in aperture.

Clockwise movement of the sample holder causes clockwise movement of chain 626 by the action of sprocket 67. Sprocket 620, however, rotates in the counterclockwise direction because of the movement of disc 612 in the clockwise direction at twice the speed of the sample holder. Sprocket 570 is rotated in the counterclockwise direction by the action of chain 622, and the aperture of the slit associated with the X-ray detector 604 is decreased.

Thus, compensation is made for the increase in X-ray power directed toward the X-ray detector at small scanning angles. Furthermore, the high signal-to-noise ratio, normally associated with small scanning angles, is minimized.

The operation of the control system will now be described.

Referring to FIGURES 3 and 4, consider stepping switch 74 to be in its fifth position so that the contactor on deck 76 is in engagement with contact 206. If switch 200 is in its upper position, contact 206 receives power from line 90 when switch 210 closes at the end of the scan of the goniometer. Power from contact 206 operates relay 88 through push button 116 and contacts 120 of stepping switch 74. The closure of contacts 86 delivers power from line 90 through resistor 92 and contacts 94 to activate stepping switch 74 momentarily. Stepping switch 74 then moves to its sixth position, at which time power from line 90 is delivered through deck 80 and through contacts 134 to step the stepping switch 74 successively until it reaches its eleventh position as shown in the drawing.

When the stepping switch is in its eleventh position, alternating current power from line 132 is delivered through deck 78 to operate motor 58, which, as will be apparent from FIGURES 1 and 2, will rotate pinion 64 to cause slide ejection arm 44 to force slide 36 back into its position in slide magazine 12. Motor 58 actuates switch 60 through cam 66 at the end of the stroke of slide ejection arm 44. Closure of switch 60 discharges capacitor 102 through deck 76, through push-button 116, and through contacts 120 of stepping switch 74 to operate relay 88 which, in turn, steps stepping switch 74 to its first position in the same manner as described previously.

In the first position of stepping switch 74, power is applied, through deck 78, to magazine indexing motor 26.

Referring again to FIGURES 1 and 2, motor 26 operates a reciprocating pawl 28, which indexes slide magazine 12 to line the next slide up with guide 38. At the end of the indexing cycle which comprises one revolution of the shaft of motor 26, cam 28 closes switch 30.

Returning to FIGURE 3, closure of switch 30 discharges capacitor 96 through deck 76, through push-button 116, and through contacts 120 to operate relay 88 which causes stepping switch 74 to step to its second position. In this position power is applied to the slide injector motor 14 to rotate its shaft in the direction such that pinion 20 (FIGURE 2) drives rack 16 to the left to push a slide from magazine 12 into guide 38. This slide engages the grooved end of the ejector arm 44 (FIGURE 1) and pushes arm 44 back until the action of arm 44 causes switch 60 to be closed by cam 66. Cam 66 is adjusted so that, as soon as the slide is in the proper position in clamps 40 and 42, switch 60 closes. Switch 60 again causes momentary closure of relay 88 and consequent stepping of stepping switch 74 to its third position.

In the third position, motor 14 is reversed to drive rack 16 back into the center of the magazine. Rack 16 moves back until its pin 48 engages the actuator of microswitch 50. Closure of microswitch 50 discharges capacitor 98 through deck 76, through push-button 116 and through contacts 120 to operate relay 88 which effects stepping of stepping switch 74 to its fourth position in the usual manner.

Referring to FIGURES 3 and 4, capacitor 146, which has been charged through resistor 148 by current from line 90 in the first three positions of the stepping switch, is discharged through contacts 152 of relay 122 and through line 150 to operate relay 220. Relay 220 is locked through closure of its contacts 482 which deliver current from line 90 through contacts 478 of relay 214 and through resistor 480.

During normal operation, switch 200 is in its extreme counterclockwise position. When relay 220 is closed, clutch 418 is activated through contacts 426, line 428, contacts 434 of relay 220 and contact 438 of switch 200 by power from line 436.

Also, during normal operation, switches 498 and 500 are in their extreme clockwise position. Closure of contacts 628 causes pulses from the movable contact of switch 236 to be delivered through contacts 488 and 504 of relay 216 and through contact 502 of switch 500, respectively, to line 258. Likewise, closure of contacts 630 of relay 220 causes pulses from line 402 to be delivered through contact 633 of switch 200, through contact 630, through contact 634 of relay 218, through contact 492 of relay 216 and through contact 496 of switch 498 to line 256.

Referring to FIGURES 4 and 5, pulses from lines 258 and 256 are delivered to multivibrators 472 and 460, respectively. With ganged switches 470 and 458 in the position shown, pulses from switch 500 are delivered to line 250 through switch 470 and pulses from switch 498 are delivered to line 248. The pulses in line 248 drive multivibrator 256 which, in turn, drives multivibrators 452 and 454 which feed the control circuitry in blocks 284 and 286 for the recording chart drive motor 288. Pulses from line 250 drive multivibrator 468, one output of which drives multivibrator 462 to feed one side of the driving circuitry comprising blocks 278 and 280 for the goniometer drive motor 282. The other output of multivibrator 468 feeds multivibrator 464, whose outputs pass through reversing contacts 461 and 463 of relay 214 and return to the other side of the driving circuitry in block 278 through lines 290 and 292.

Motor 288, which drives the chart mechanism is operating at its lowest speed, and motor 282 is moving the goniometer in the direction such that the angle between the plane of the sample slide and the X-ray detector is increasing. The speed of motor 282 is determined by the position of switch 236. A high speed is usually selected, since no information is recorded in this direction of scan.

When the goniometer reaches the upper limit of its scan, switch 194 is closed connecting power from line 90 through resistor 212, and through line 226 to operate relay 216. Closure of relay 216 connects the pulses from line 484 to line 248 through contacts 492 of relay 216, contacts 496 of switch 498, through line 256, and through switch 458. Line 494 is also connected to line 250 through contacts 504 of relay 216, switch 500 and switch 470.

Magnetic clutch 418 is engaged at this time by closure of contacts 430 on relay 216. This sets the initial recorder deflection reference level from which the previously described speed change cams operate.

Relay 224 is closed by closure of contacts 228 on relay 216 by power delivered through line 444 from switch 440. Switch 440 is operated by a cam (not shown) driven by the goniometer drive motor through gears so that it changes state every ½° throughout the scan. After the first closure of switch 444 after relay 216 closes, relay 224 will close by power applied from line 436 through switch contacts 440. Closure of contacts 474 of relay 224 applies power from line 90 through contacts 474 to relays 214 and 218. Operation of contacts 478 of relay 214 removes power from line 90 from line 476, allowing relay 220 to open. Closure of contacts 486 on relay 218 causes both relays 214 and 218 to be held closed by power from line 484.

The reversing contacts 461 and 463 on relay 214 are now operated causing the goniometer motor to change its direction. When the goniometer begins to move in this new direction, contacts 194 open, removing power from relay 216.

Contacts 432 on relay 218 connect lines 436 and 428 to hold clutch 418 engaged. Contact 636 connects terminal 398 to line 250 through contacts 636, contacts 504 of relay 216, switch 500 and switch 470 to deliver pulses from terminal 398 to the driving circuitry for the goniometer drive motor. Contacts 634 on relay 218 connect terminal 398 to line 248 to feed the chart motor drive circuitry.

Reference should now be made to FIGURE 7, in which switches 234 are shown. These switches are operated by cams driven by the recorder through clutch 418, and are arranged to be closed individually at various values of recorder deflection. The banks of switches 232 (FIGURE 4) can be set to deliver pulses at any one of eight frequencies to each of terminals 408, 410 and 412. Thus, the frequencies of the pulses delivered through contact 414 and through contact 416 of relay 386 to line 404 can be chosen by setting the individual banks of switches 232. The scan speed, then, automatically adjusts itself to correspond to four different ranges of recorder deflection so long as relay 386 is not energized by the range changing devices being in one of the ranges other than its lowest range.

If ganged contacts 470 and 458 are in their middle position, the chart motor operates at half the speed of the goniometer scanning motor since the chart driving multivibrator receives pulses from an additional multivibrator 460 which divides the frequency of the pulses from line 256 by a factor of two. Likewise, if contacts 470 and 458 are in their extreme counterclockwise position, multivibrator 472 is switched into the driving circuit for the goniometer motor, causing it to operate at half the speed of the chart motor. These switches are manually operable, and they permit spreading out of the chart record when better readability is desired.

Referring again to FIGURES 4 and 7 when the goniometer reaches its lower limit, switch 210 operates to connect power from line 90 through resistor 212, switch 210, line 232, contact 202 of switch 200, line 204 and through contact 206 and deck 76 of stepping switch 74 to advance stepping switch 74 to its tenth position to initiate another cycle of operation.

When switch 210 operates in this manner, it also removes holding power from relays 214 and 218. The opening of relay 214 reverses the direction of operation of the goniometer drive motor and again applies locking power for relay 220 at contacts 482 (now open).

When relay 218 opens, opening of contacts 636 interrupts pulses from terminal 398 causing the goniometer drive motor to stop. Contacts 634 of relay 218 switch the pulses to the chart drive motor from terminal 398 to line 494. The chart drive motor continues to run during the slide changing operation at a slow speed to provide a separation of records on the recorder paper.

In the center position of the mode selector switch 200, the operation of the apparatus is the same as outlined above until the final step. Contacts 208 of switch 200 being open in this position, advancing of stepping switch 74 (FIGURE 3) to its sixth position by closure of switch 210 (FIGURE 4) is prevented. Thus, instead of starting another cycle of operation upon the completion of the scan, the apparatus merely stops operating until it is manually started again.

In the fully clockwise position of switch 200, the slide change mechanism is not operated. The same sample is scanned alternately in opposite directions until the apparatus is stopped manually. The operation can be started by manually operating switch 210. This operates relay 220 through contact 222 of switch 200. Relay 220 locks itself through its contacts 482. Contacts 434 of relay 220 energize the clutch 418 through contacts 438 of switch 200. Contacts 628 of relay 220 connect terminal 398 to the goniometer motor drive circuitry through contact 490 of switch 200 and through switches 500 and 470. Contacts 630 of relay 200 connect terminal 398 through contacts 632 of switch 200 to the chart drive motor circuitry through switches 498 and 458. When the high limit of the scan is approached, switch 194 operates to close relay 216. Contacts 492 switch the chart drive from terminal 398 to line 494, and contacts 504 switch the goniometer drive from terminal 398 to line 494. Contacts 430 are in parallel with contacts 434 of relay 220 when switch 200 is in the clockwise position, so that, when relay 220 opens, clutch 418 will remain engaged. Contacts 228 of relay 216 connect switch 440 to relay 224 so that, at the next closure of switch 440, relay 224 will operate. When relay 224 operates, it applies power through contacts 474 to relays 214 and 218. Relay 214 reverses the goniometer motor through contacts 461 and 463. Opening of contacts 478 removes locking voltage from relays 222. Closure of contacts 486 on relay 218 locks both relays 214 and 218 by current through line 484 from switch 210. Contacts 432 of relay 218 hold the magnetic clutch engaged. Contacts 636 of relay 218 connect the goniometer motor drive circuitry to terminal 398. Contacts 634 connect the chart drive motor circuitry to terminal 398. When the goniometer motor reverses, switch 494 opens and removes power from relay 216. When switch 210 is operated at the low limit of goniometer scan, power is removed from relays 214 and 218. Switch 210 applies power to relay 220 through its normally open contacts, and the above sequence is repeated.

The operations of the various circuits associated with the control system will now be described.

Referring to FIGURES 1 and 3, relay 122 is provided to accommodate a condition wherein no slide is present in the magazine in the position aligned with the slot between guide members 38. When stepping switch 74 goes from its first position (in which the magazine indexing motor 26 is operated) to its second position, rack 16 is pushed outward by the action of motor 14. With no slide in place, however, arm 44 is not pushed backward, and, consequently, switch 62 is not actuated. On the other hand, rack 16 now moves out far enough so that pin 48 engages the actuator of microswitch 52. Closure of switch 52 discharges capacitor 100, which had been charged through resistor 110, through diode 128 to terminal 130 on deck 76 of the stepping switch. Since the wiper of the stepping switch is in the second position at this time, the discharge of capacitor 100 operates relay 88 through push-button 116 and through contacts 120 of stepping switch 74. Momentary closure of relay 88 causes stepping switch 74 to move to its third position in the usual manner.

The discharge of capacitor 100 simultaneously operates relay 122 through diode 126. Relay 122 is locked through contacts 166 on stepping switch 74 and through resistor 164. These contacts, like contacts 134 are closed through all positions of stepping switch 74 except the home position which is the position shown. Closure of contacts 144 on relay 122 connects terminals 140 and 142 of deck 80 to line 90 so that automatic homing of stepping switch 74 begins when the stepping switch reaches its fourth position rather than when it reaches its sixth position. When switch 74 reaches its home position, contacts 166 open and remove power from relay 122.

Referring to FIGURES 3 and 4, opening of contacts 152 prevents relay 220 from being actuated through line 150 when the stepping switch is in its fourth position.

Closure of contacts 450 activates the chart marker 442 through line 448 and through line 436, switch 440 and line 444 to indicate by a marking on the recording chart that no slide was in place for this particular cycle.

When the stepping switch is in its third position, motor 14 is reversed, and, when the rack 16 returns to its normal position, switch 50 is actuated, causing stepping switch 74 to move to its fourth position. At this time, since terminals 140 and 142 on deck 80 are activated, the stepping switch automatically steps to its eleventh position.

The apparatus now operates in its normal fashion unless it finds another empty magazine slot, in which case the operation described above is repeated.

With regard to the operation of the automatic shut-off circuit, reference should be made to FIGURES 4 and 8. Momentary closure of push-button 522 closes and locks relay 520 and initiates operation of the entire system. Timing motor 534 is started at this time.

At the beginning of each normal scanning cycle, switch 194 is closed and power is delivered to terminal 504 to operate relay 508. Opening of contacts 550 releases clutch 548, and the timing cam is reset to its initial position without opening switch 532.

Most malfunctions of the control circuitry will result in cycle times which are unusually long. If the time for a cycle is so long that switch 194 does not close and switch 532 is permitted to open, relay 520 will open and power will be removed from the entire system. Failures of the slide-change programming circuit or of the scanning control circuitry resulting in inordinately long cycle times will thus cause the apparatus to be shut off.

The operation of the present invention is completely automatic, and, once initiated, it no longer requires the attention of an operator. When the entire set of slides has been examined by the scanning apparatus, switch 162 (see FIGURES 1 and 3) is opened by a protruding member on the rotating magazine 12. Switch 156 is in its extreme counterclockwise position during normal operation and delivers power through line 158 to hold a power supply relay closed so that power is delivered to terminals 178 through 190. When switch 162 opens, this relay is opened and relay and motor operating power is removed from the control circuitry of FIGURES 3 and 4. Since the programmer stepping switch 74 can no longer operate, power is removed from the entire system by the time-operated automatic shut-off circuit of FIGURE 8.

The middle position of switch 156 is a stopping position. If switch 156 is in its extreme counterclockwise position, the programmer operates until the stepping switch 74 reaches its fourth position, at which time power is removed from terminals 178 through 190.

The following will summarize the operation of the apparatus just described.

Before operation is initiated, a number of preliminary steps must be performed. The slide magazine must be loaded and placed in position in the magazine holder. The relative speeds of the chart and goniometer are set by switches 470 and 458. Switches 498 and 500 are turned clockwise for automatic operation of the speed-changing circuitry. Switches 232 are set to predetermine the scanning speeds desired at different values of recorder deflection. Switch 200 is turned completely counterclockwise for automatic operation.

If it is necessary, the means providing bucking voltage in the range-changing circuit of FIGURE 7 is calibrated by turning switch 344 clockwise and adjusting potentiometer 362. The range-changing step switches 310 and 311 are reset to the lowest range position.

Push-button 116 is closed an appropriate number of times so that stepping switch 74 moves to a position such that the slide motor is activated. The first slide is then placed in the scanning position in the clamp. Scanning then begins in one direction.

At the beginning of the scan, both the goniometer motor and the chart motor are operating at the highest speed selected by the position of contact 410 of switch 232.

Both the collimating and the receiving slits are almost closed at the beginning of the scan, and, as the scan progresses, i.e., the angle of incidence of the X-rays decreases, the slits open continuously, their width being a function of the angle between the X-ray direction and a normal to the sample slide. The slits are made to open as the angle of incidence decreases so that the area on the sample slide seen both by the X-ray collimator and the receiving collimator remains substantially constant throughout the scan. As indicated previously, this slit adjustment provides an improved signal-to-noise ratio, which, at high angles of incidence, tends to be high because of X-ray diffusion.

The function mentioned above, relating slit width with goniometer angle, is approximately linear because of the linear shape of the cam edges on the slit-defining members.

During the scan, as recorder response increases, the speed changing switches close succesively at different levels and cause the speeds both of the goniometer and of the chart to decrease successively. The recorder level above which the speed changes take place is initially set when the magnetic clutch is set at the end of the reverse scan. If, during the forward scan cycle, the recorder deflection falls below this level, the clutch is released and reset at the minimum recorder deflection. This establishes a new reference level for the speed cams which will be maintained throughout the rest of the scan unless the recorder deflection again falls below this level, at which time a new reference level is set. Since the initial level is set at a time when the angle between the plane of the sample and the direction of incident X-rays is the greatest, this usually is the lowest background level and will be maintained for the entire scan. The values of these predetermined speeds are discrete; however, the recorder levels at which they change are made to depend on the lowest received X-ray intensity, i.e. background.

The speed change provision in this invention allows for rapid scan of the goniometer in areas wherein no peaks in X-ray intensity are encountered, the positions of the peaks determining the identity of the substance being examined.

An X-ray detector operates to produce pulses, the frequency of which is a measure of the X-ray detection. In order to operate a recorder these pulses must be, in effect, counted over a predetermined interval of time, such effective counting being the function of the integrator. While this interval of effective counting may be short, rapid changes of X-ray intensity with change of goniometer angle may occur, if the rate of scanning is rapid, may be in less time than the counting interval: for example, assuming a counting interval of a unit time a rapid rate of scan may involve a relatively low frequency of pulses at the beginning of this unit interval, a rapid rate during a mid portion of the interval, and again a lower rate at the end of the interval, so that the average number of pulses summed during the interval would be less than it would be if the interval encompassed only the pulses in the high rate. It is desirable, therefore, to slow down the scanning rate when responses of significance are involved in order to secure an accurate record of large changes of intensity with the angle of scan. On the other hand, it would waste much time to scan slowly throughout the entire scanning range because of the large portions of such a range which will ordinarily give no significant results. It is for this reason that the scanning speed changes are effected.

The scanning device is able to operate at five different speeds including the slow speed provided for the upper recorded ranges.

The range-changing device in FIGURE 7 is not of the usual kind. In ordinary range changers, i.e. of an ordinary voltmeter, the various ranges encompass successively greater differences between the maximum value and zero; and the effect is that of changing the amount of needle deflection per volt, i.e. the sensitivity. The range-changing device in the present invention is not only automatic, but provides a plurality of discrete ranges of values indicated in such fashion that the sensitivity of the recorder remains substantially constant through all of these ranges. A bucking voltage, provided by battery 360, is placed in series with the input to the recorder and is capable of being increased by successive equal amounts as the recorder deflection approaches maximum value. The overall result of the use of this range-changing mechanism is an effective chart width of approximately five times the actual width.

Typically, in its operation, as the stylus on the recorder approaches 100% of its maximum deflection, a first bucking voltage is applied, and the stylus returns immediately to 5% of its maximum deflection. As recorder deflection increases further so that the stylus again approaches the 100% limit, an additional bucking voltage is provided automatically. When the stylus falls to a predetermined extent below 5% of its maximum in any range, the corresponding last step of bucking voltage is removed from the recorder input, and so on.

Close of any one of the relays 334 through 340 in FIGURE 7, causes activation of relay 386 through any one of contacts 388. This causes closure of line 404 to line 402 which delivers low-speed pulses to operate the goniometer and recorder chart drive motors. Thus, in all but the lowest range of recorder input, the scan is at the lowest speed.

When the goniometer reaches the predetermined limit of its scan in the first direction, the programming circuit causes it to reverse and to scan in the opposite direction. During this new scan, the speed control and range-changing devices operate to produce a chart record which exhibits the peaks in diffracted X-ray intensity in great detail. When the goniometer returns to its original position, the chart and goniometer drive motors are stopped, and the programmer initiates removal of the slide from the scanning position. When this slide is returned to its original position in the magazine, the programmer operates the magazine indexing mechanism, which steps to a position such that a next slide can be removed from the magazine and placed in scanning position as before.

As explained previously, if a slide is missing in a particular position in the magazine, the programmer by-passes the scanning operation.

If the entire cycle outlined above requires more than the amount of time predetermined by the automatic shut-off mechanism of FIGURES 8 and 13, power is removed from the entire system. A typical cause of unduly long cycle time which would cause the automatic shut-off device to operate might be, for example, failure of the programming and stepping switch, failure of one of the switches operable by the slide changing motors or failure of one of the goniometer limit switches 194 and 210.

It will be apparent that various modifications can be made to the apparatus of the present invention without departing from its scope as defined by the following claims.

What is claimed is:

1. A slide changing apparatus for use with an X-ray diffraction scanning apparatus comprising a rotatable slide magazine, means operable by a first motor for removing a slide from said magazine and placing said slide in a position to be examined by said X-ray diffraction scanning apparatus, switching means activated when said slide is in said position for returning said slide removing means to its original position, switching means operable in response to the return of said slide removing means for initiating scanning of said scanning apparatus, means providing a signal at the end of the scan of said scanning apparatus, means responsive to said signal to operate a second motor, means operable by said second motor for reutrning said slide to said magazine, means operable by said second motor to provide a signal initiating operation of a third motor, said third motor being operable to index said slide magazine, switching means operable to stop said third motor, said last-mentioned switching means being operable to initiate operation of said first motor, and switching means operable by said slide removing means when no slide exists in the position in said magazine such that it would have been removed by said slide removing means, said last-mentioned switching means initiating operation of said second motor and rendering said scanning apparatus inactive.

2. A scanning apparatus for determining X-ray diffraction spectra comprising a rotatable X-ray detection means, recording means receiving the output of said X-ray detection means, a pulse-operated stepping motor rotating said X-ray detection means, a plurality of pulse sources delivering pulses of different frequencies, switching means receiving said pulses, said switching means being operable by the output of said recording means to select pulses from one of said pulse sources which one of said pulse sources is determined by the output of said recorder, and motor driving means operating said stepping motor and receiving pulses selected by said switching means.

3. A scanning apparatus for determining X-ray diffraction spectra comprising a rotatable X-ray detection means, recording means receiving the otutput of said X-ray detection means, a pulse-operated stepping motor rotating said X-ray detection means, a plurality of pulse sources delivering pulses of different frequencies, a manually operable selective switching means delivering pulses of selected frequencies to a second switching means, said second switching means being operable by the output of said recording means to select pulses of one of said selected frequencies, said one of said selected frequencies being determined by the output of said recorder, and motor driving means operating said stepping motor and receiving pulses selected by said second switching means.

4. A scanning apparatus for determining X-ray diffraction spectra comprising a rotatable X-ray detection means, a pulse-operated stepping motor driving said rotatable X-ray detection means, a driving circuit for said motor, a recorder, a shaft arranged to rotate in response to the input to said recorder, a magnetic clutch, a plurality of cams driven by said shaft through said magnetic clutch, spring means urging said cams in a direction to oppose the direction in which decreased recorder input tends to urge said cams, a plurality of switches arranged to be operated successively by rotation of said cams, a plurality of pulse sources having different output frequencies, said switches being arranged to deliver to said driving circuit pulses at one of said frequencies, said one frequency being determined by the positions of said cams, an additional cam driven by said shaft, and a normally closed switch delivering power to hold said magnetic clutch engaged, said normally closed switch being openable by said additional cam when the input to said recorder falls below a predetermined level so that said spring means can urge said additional cam in the direction such that it closes said normally closed switch to re-engage said clutch.

5. An apparatus for determining X-ray diffraction spectra comprising an X-ray source, X-ray detection means, means rotating said X-ray detection means in a path to receive X-rays diffracted by a sample whose X-ray spectrum is to be determined, an integrator receiving the output of said X-ray detection means, a moving chart recorder receiving and recording the level of the output of said integrator, rotating means determining the speed of the chart of said moving-chart recorder, means sychronizing the speeds of both said rotating means, means establishing a plurality of ranges of the output of said integrator and means responsive to the output of said integrator for determining speeds of both said rotating means for each range of said plurality of ranges.

6. An apparatus for determining X-ray diffraction spectra comprising an X-ray source, X-ray detection means, means rotating said X-ray detection means in a path to receive X-rays diffracted by a sample whose X-ray spectrum is to be determined, an integrator receiving the output of said X-ray detection means, a moving chart recorder receving and recording the level of the output of said integrator, rotating means determining the speed of the chart of said moving-chart recorder, means sychronizing the speeds of both said rotating means, means establishing a plurality of ranges of the output of said integrator, means responsive to the output of said integrator for determining speeds of both said rotating means for each range of said plurality of ranges, and means for marking said chart at intervals corresponding to predetermined spacial intervals in said path of said X-ray detection means.

7. A control system for use with an X-ray diffraction apparatus comprising an X-ray source and a scanning X-ray detection means comprising means removing a sample from the position in said apparatus in which its X-ray spectrum is determined by said apparatus, means inserting a new sample into said position, means operable when said new sample is in said position for initiating scanning of said X-ray detection means, means operable at the end of the scan of said X-ray detection means for initiating operation of said sample-removing means, the successive operation of all aforesaid means constituting a repeatable cycle, timing means predetermining a length of time, and means for removing power from at least one of all aforesaid means when the time for said cycle exceeds said predetermined time.

8. An apparatus for determining X-ray diffraction spectra comprising an X-ray source, X-ray detection means, an integrator receiving the output of said X-ray detection means, recording means receiving the output of said integrator, means modifying the level of the output of said integrator, and switching means operable at a predetermined upper limit of the input to said recording means, said modifying means being operable by said switching means to reduce the level of the input to said recorder by the same predetermined fixed amount each time said first switching means is operated.

9. An apparatus for determining X-ray diffraction spectra comprising an X-ray source, X-ray detection means, an integrator receiving the output of said X-ray detection means, recording means receiving the output of said integrator, means modifying the level of the output of said integrator, a first switching means operable at a predetermined upper limit of the input to said recording means, and a second switching means operable at a predetermined lower limit of the input to said recording means, said modifying means being operable by said first switching means to reduce the level of the input to said recorder by the same predetermined fixed amount each time said first switching means is operated, and said modifying means being operable by said second switching means to increase the level of the input to said recorder by said predetermined fixed amount each time said second switching means is operated.

10. An apparatus for determining X-ray diffraction spectra comprising an X-ray source, X-ray detection means, an integrator receiving the output of said X-ray detection means, recording means receiving the output of said integrator, means modifying the level of the output of said integrator, a first switching means operable at a predetermined upper limit of the input to said recording means, a second switching means operable at a predetermined lower limit of the input to said recording means, a first stepping switch operable by said first switching means, and a second stepping switch operable by said second switching means, successive outputs of said first stepping switch operating said modifying means to reduce the level of the input to said recording means by successive equal predetermined amounts, and said second stepping switch operating said modifying means to increase the level of the input to said recorder by said successive equal predetermined amounts.

11. In combination, a voltage measuring device having a movable element the amplitude of the deflection of which is a function of the magnitude of said voltage, indicating means operable by said movable element, a first switching means operable by said movable element when the deflection of said movable element exceeds a first predetermined level, a second switching means operable by said movable element when the deflection of said movable element falls below a second predetermined level, means operable in response to operation of said first switching means for lowering the input to said measuring device by the same predetermined fixed amount each time said first switching means is operated, and means operable in response to operation of said second switching means for increasing the input to said measuring device by said predetermined fixed amount each time said second switching means is operated.

12. An apparatus for determining X-ray diffraction spectra comprising an X-ray source, scanning means including X-ray detection means, recording means receiving the output of said X-ray detection means, means modifying the level of the output of said detection means, said modifying means being operable at a predetermined upper limit of the input to said recording means to reduce the level of the output of said detection means by a predetermined amount, means responsive to the level of the input to said recording means for controlling the speed of operation of said scanning means, and means preventing said means for controlling the speed of operation of said scanning means from causing said scanning means to operate at a speed higher than its lowest speed when the output of said detecting means is greater than a first predetermined limit.

13. A scanning apparatus for determining X-ray diffraction spectra comprising a rotatable X-ray detection means, a motor driving said rotatable X-ray detection means, means controlling the speed at which said rotatable X-ray detection means is driven by said motor, a recorder, a shaft arranged to rotate in response to input to said recorder, a clutch, a plurality of cams driven by said shaft through said clutch, spring means urging said cams in a direction to oppose the direction in which decreased recorder input tends to urge said cams, said means controlling the speed at which said rotatable X-ray detection means is driven by said motor being operated by said cams to increase the speed at which said X-ray detection means is driven with decreasing recorder input, means driven by said shaft for disengaging said clutch when the input to said recorder falls below a predetermined level so that said spring means can urge said means for disengaging said clutch in a direction such that said clutch is caused to be re-engaged.

(References on following page)

References Cited

UNITED STATES PATENTS

| | | | |
|---|---|---|---|
| 2,619,600 | 11/1952 | Hamacher | 250—51.5 |
| 2,819,405 | 1/1958 | Bond | 250—51.5 |
| 2,870,337 | 1/1959 | Neff | 250—51.5 |
| 2,973,238 | 2/1961 | Herzog | 346—65 |
| 3,051,834 | 8/1962 | Shumula et al. | 250—51.5 |
| 3,070,797 | 12/1962 | Wreyford | 346—65 |
| 3,177,360 | 4/1965 | Hague et al. | 250—51.5 |
| 3,263,078 | 7/1966 | Thackara et al. | 250—51.5 |

RALPH G. NILSON, *Primary Examiner.*

A. L. BIRCH, *Assistant Examiner.*